United States Patent [19]
Gillissen et al.

[11] Patent Number: 5,694,018
[45] Date of Patent: Dec. 2, 1997

[54] APPARATUS FOR CHARGING A BATTERY

[75] Inventors: Eduard E. A. Gillissen, Heerlen; Johann R. G. C. M. Van Beek, Eindhoven, both of Netherlands

[73] Assignee: U.S. Philips Corporation, New York, N.Y.

[21] Appl. No.: 639,983

[22] Filed: Apr. 26, 1996

[30] Foreign Application Priority Data

Apr. 30, 1995 [EP] European Pat. Off. ............ 95201111
Jul. 4, 1995 [EP] European Pat. Off. ............ 95201813

[51] Int. Cl.⁶ .......................... H01M 10/48; G01L 1/22
[52] U.S. Cl. ........................................ 320/2; 338/3
[58] Field of Search ........................... 320/2; 338/2, 3, 338/4; 429/96, 100

[56] References Cited

U.S. PATENT DOCUMENTS 3,665,756 5/1972 Russell ..................... 338/3 X
5,260,638 11/1993 Hirahara ..................... 320/46

FOREIGN PATENT DOCUMENTS 268445 7/1988 Japan ..................... H02J 7/04

Primary Examiner—Peter S. Wong
Assistant Examiner—Patrick B. Law
Attorney, Agent, or Firm—Michael E. Marion

[57] ABSTRACT

Apparatus for charging a battery (5) includes a battery compartment for accommodating the battery in a manner such that its electrical terminals are in contact with a pair of electrodes. The electrodes are connectable to respective poles of a controllable source of electrical energy. A resistive strain gauge (15) for monitoring mechanical deformation of the battery is attached to an elastic surface within the battery compartment, against which surface the battery is pressed when it is located in the battery compartment. In a particular embodiment, one of the electrodes (9) is a sprung metallic sheet and the elastic surface is located on this sheet.

8 Claims, 1 Drawing Sheet

APPARATUS FOR CHARGING A BATTERY

BACKGROUND OF THE INVENTION

This invention relates to an apparatus for charging a battery, comprising a battery compartment for accommodating the battery in a manner such that its electrical terminals are in contact with a pair of electrodes, the electrodes being connectable to corresponding poles of a controllable source of electrical energy and further comprising a resistive strain gauge for monitoring mechanical deformation of the battery.

The invention also relates to a battery-operated electrical apparatus, comprising a battery compartment for accommodating a rechargeable battery in such a manner that its electrical terminals are in contact with a pair of electrodes which are connected to a controllable drain of electrical energy (such as an electric motor, light source, audio device, video device, computer apparatus, etc.).

The term "battery" is here intended to refer to either individual cells or battery packs, and refers specifically to secondary (i.e. rechargeable) batteries.

It is known that the physical dimensions of a battery can change as a result of increased internal pressure and temperature during charging. Such increase is attributable to the occurrence of certain chemical reactions within the battery, the rate and type of which are determined by the battery's charge state at any given time. In particular, at the end of a charging procedure, additional electrical energy supplied to the battery will, in general, no longer cause an increase in its internal charge, but will instead provoke a sharp rise in the battery's internal pressure and temperature, causing the battery to expand slightly (these effects being particularly prominent in NiCd and NiMH (Nickel Metal Hydride) batteries). A resistive strain gauge can be employed to monitor any such mechanical deformation of the battery, and the detection of (the onset of) sharply increasing deformation can then be used as an indication that efficient charging has been completed, and that the electrical energy source should be switched off. Such action is particularly important in the case of so-called "quick charging", where the battery can be severely damaged if the charging process is not carefully monitored and interrupted in good time.

In a typical resistive strain gauge, a fine-wire resistive element is provided on (or within) a flexible foil. When this element is subjected to mechanical strain, its electrical resistance changes in a substantially proportional manner. This electrical resistance can be measured, for example, by connecting the extremities of the resistive element across an open leg of a Wheatstone bridge. Either the DC or the AC impedance may be monitored in this fashion.

An apparatus as specified in the opening paragraph is known from U.S. Pat. No. 5,260,638 and from laid-open Japanese Patent Application JP 63-268445 (filed Apr. 14, 1987). In both of these documents, the employed strain gauge is directly attached (e.g. glued) to the battery-can (battery wall), so as to achieve intimate mechanical contact with the battery. This, however, has a number of considerable disadvantages. For example, in order to place a new battery in the battery compartment, the strain gauge (and its electrical leads) must first be removed from the old battery and then re-attached to the replacement battery. This is not only time-consuming and user-unfriendly, but can also cause the fragile strain gauge to be (permanently) damaged. An alternative is to provide each battery with its own permanently attached strain gauge. This, however, is a rather expensive solution, and the permanent presence on the battery of the strain gauge's electrical leads would make handling such a battery, and its application in an appliance, rather cumbersome.

SUMMARY OF THE INVENTION

It is an object of the invention to circumvent such difficulties. In particular, it is an object of the invention to provide a battery charging apparatus in which it is easy to insert and remove different batteries. In addition, it is an object of the invention to provide a battery charging apparatus in which the risk of damage to the employed resistive strain gauge is minimal.

These and other objects are achieved in an apparatus as described in the opening paragraph, characterised in that the strain gauge is attached to an elastic surface within the battery compartment, against which surface the battery is pressed when it is located in the battery compartment.

In experiments leading to the invention, the inventors observed that, even though the expansion of a battery-can during charging is only very slight, it can nevertheless be accurately monitored using indirect means rather than the conventional direct means. In other words, if the strain gauge is mounted on a surface which is in intimate contact with the battery but which is not actually part of the battery-can itself, then, despite the inevitable insensitivities introduced by elastic losses and increased inertia, and the fact that only a component of the expansion along a given direction may be thus measurable, it is still possible to make a reliable strain measurement which is free of significant hysteresis, without the need to modify the strain gauge or the electrical means to which it is connected.

A great advantage of this insight is that, in the inventive apparatus, the resistive strain gauge may be permanently located on an appropriate surface of the battery compartment itself, and need no longer be glued to a wall of the battery. In such an apparatus, the user can remove and replace batteries without having to make any allowance for the presence of the strain gauge, whereas the strain gauge itself is also protected from damage.

According to the invention, the resistive strain gauge can be attached to various elastic surfaces within the battery compartment as long as such surfaces experience a mechanical deformation in response to expansion and contraction of the battery. For example, the battery compartment may have a flexible plastic bottom surface on which the battery is laid in a horizontal position, together with a lid which pushes the battery against this bottom surface. The strain gauge can then be attached (e.g. glued) to a part of this bottom surface without having to be in direct contact with the battery itself. Alternatively, the strain gauge can be attached to the lid of such a battery compartment. In yet another embodiment, the battery compartment accommodates the battery in a hollowed-out space whose end-walls contain sprung metallic terminals, but whose close-fitting side-walls comprise a flexible sheet (e.g. plastic, insulated metal, glass, etc.). The strain gauge can then be mounted on either the front or back surface of such a flexible sheet.

A preferential embodiment of the apparatus according to the invention is characterised in that one of the electrodes is a sprung metallic sheet and that the elastic surface is located on this sheet. Such an embodiment advantageously exploits the insight that the mechanical deformation of the battery is generally more pronounced in the longitudinal direction (i.e. along its length) than in the transverse direction (i.e. across its width). Measurement of the longitudinal strain in the battery can therefore be performed more sensitively than measurement of the transverse strain.

3

In a specific example of the embodiment in the previous paragraph, a first electrode may take the form of a thin rectangular metal sheet (e.g. 1 mm galvanised iron), one edge of which is embedded in an internal surface of the battery compartment and the three other edges of which are free, thereby forming a sprung cantilever which protrudes from the said internal surface. If the second electrode is rigid, and if the separation of the electrodes is slightly smaller than the length of a particular type of battery, then placement of such a battery between the electrodes will force the first electrode into a state of elastic strain, which will change if the battery subsequently expands or contracts. The resistive strain gauge may thus be attached to the first electrode, preferably at a location where it will not be rubbed against during insertion and removal of the battery, e.g. on the back surface of the electrode.

The apparatus according to the invention is also suitable for detecting over-discharging of a battery, since this is also accompanied by internal gas generation and attendant expansion of the battery. In such a scenario, the measured expansion of the battery beyond a certain point can be used as a signal to terminate further discharging. In this respect, the invention also provides an apparatus as specified in the second opening paragraph, characterised in that a resistive strain gauge is attached to an elastic surface within the battery compartment, against which surface the battery is pressed when it is located in the battery compartment. In a preferential embodiment of such an apparatus, one of the electrodes is a sprung metallic sheet and the elastic surface is located on this sheet.

The inventive apparatus is of great advantage in view of its safety aspects. Using the resistive strain gauge incorporated in accordance with the invention, it is possible to efficiently detect mechanical deformation of the battery-can resulting from, for example:

internal or external damage to the battery, whereby attempts to recharge the battery will immediately lead to internal gas production and/or excessive heating;

insertion of a battery the wrong way around in the battery compartment (inverted polarity).

With the aid of calibration experiments, it is possible to monitor the mechanical strain in the battery as a function of charging (discharging) time, while simultaneously measuring the quantity of charge supplied to (drawn from) the battery. When recharging (discharging) the battery on subsequent occasions, the measured strain at any given time then allows the corresponding residual charge value to be deduced. In this way, the electrical voltage and/or current supplied to (drawn from) the battery during charging (discharging) can, if so desired, be automatically tailored to particular requirements. For example, it is possible to automatically interrupt charging when the battery is 90% charged, or to slow down the charging procedure as charge saturation is approached, or to terminate discharge of the battery when its residual charge has fallen to 10%.

BRIEF DESCRIPTION OF THE DRAWINGS

The invention and its attendant advantages will be further elucidated with the aid of exemplary embodiments and the accompanying schematic Figures, wherein.

4

DESCRIPTION OF THE PREFERRED EMBODIMENTS

Embodiment 1

Figure 1:
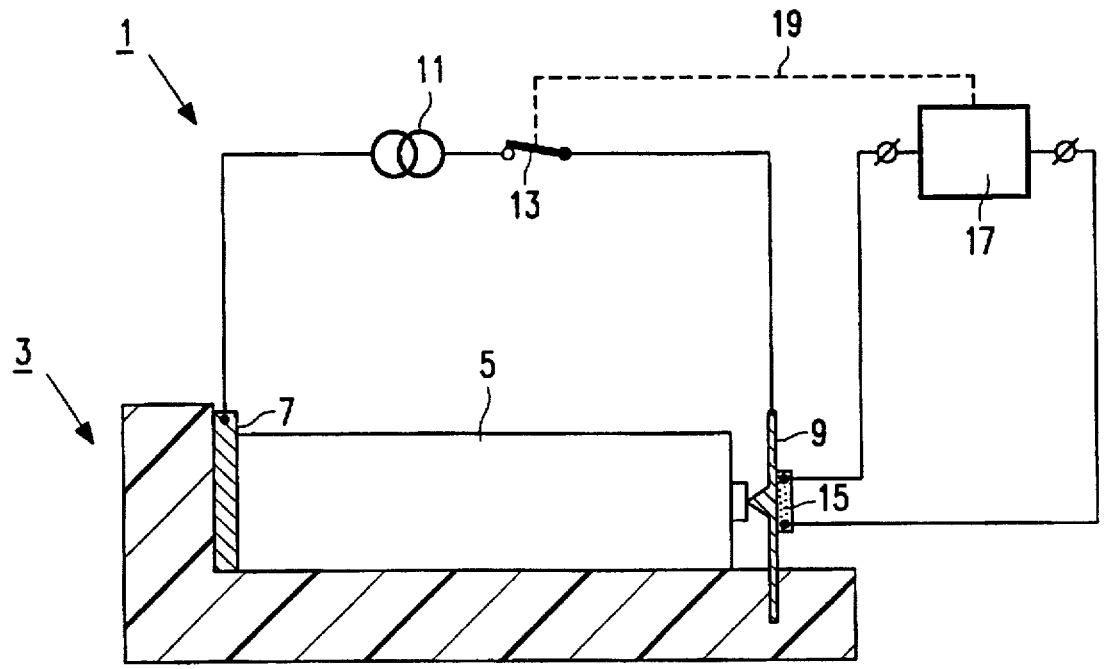
FIG. 1 depicts an apparatus in accordance with the invention.

FIG. 1 renders a (partially) cross-sectional view of an apparatus 1 in accordance with the present invention. This apparatus 1 comprises a compartment 3 for accommodating a battery 5, which is positioned such that its terminals are in contact with a pair of electrodes 7, 9. These electrodes 7, 9 are in turn connected to a source I 1 of electrical energy, which can be switched with the aid of the switch 13.

The electrode 7 is to be regarded as being rigid since it consists of a relatively thick metallic plate which is intimately mounted on an end-wall of the compartment 3. The electrode 9, on the other hand, is elastic. It comprises a thin metallic sheet which is partially embedded in the floor of the compartment 3 so as to form a sprung cantilever. The distance between the electrodes 7 and 9 is thus tailored to the length of the battery 5 so that, when the battery 5 is in place, it is tightly pushed against the electrode 9, thereby forcing the electrode 9 into a state of elastic strain.

A resistive strain gauge 15 has been stuck onto the rear surface of the elastic electrode 9. This strain gauge 15 comprises a flexible plastic foil which carries a fine resistive element, and has been connected to electrical means 17 which can be used to measure the electrical resistance of the said element. For example, the means 17 may comprise a Wheatstone bridge, one leg of which contains the strain gauge 15. If so desired, the means 17 can be connected via a signal carrier 19 to the switch 13. Dependent on the electrical resistance value demonstrated by the strain gauge 15, an appropriate signal from the means 17 can then be used to open the switch 13 automatically.

Embodiment 2

In an apparatus otherwise identical to that depicted in the Figure, the source 11 is replaced by a drain of electrical energy (e.g. a motor). In accordance with the invention, the strain gauge 15 can then be used to detect (the onset of) over-discharging of the battery 5, whereby the switch 13 can be (automatically) opened to interrupt further discharge.

Embodiment 3

Figure 2:
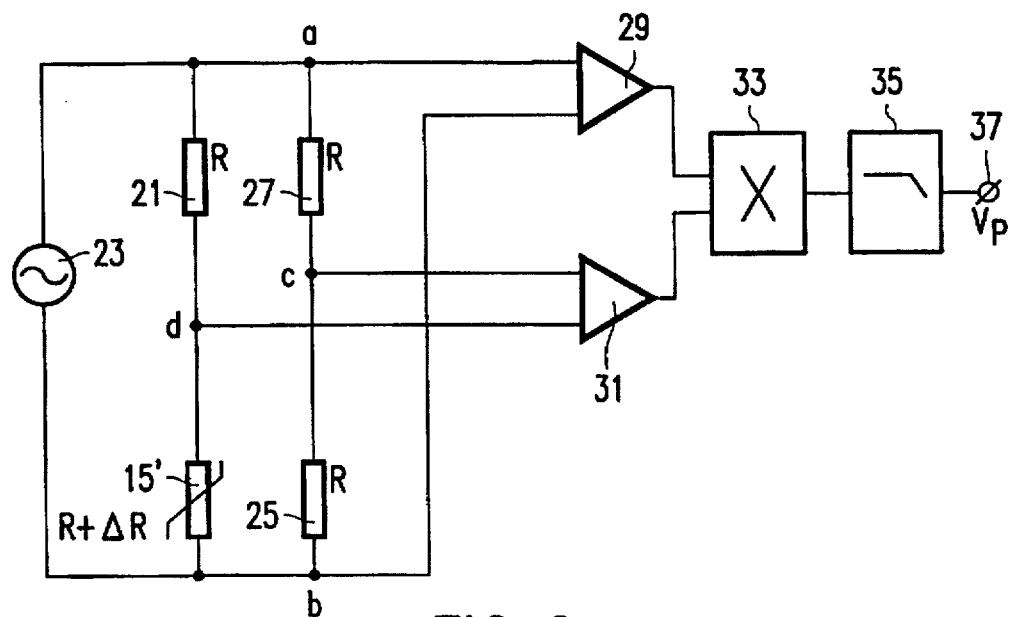
FIG. 2 depicts electrical means suitable for monitoring the electrical resistance of the resistive element in the apparatus of FIG. 1.

FIG. 2 depicts a suitable embodiment of the electrical means 17 employed to monitor the electrical resistance of the resistive element in the strain gauge 15 in FIG. 1. Corresponding features in FIGS. 2 and 1 are denoted by the same reference symbols.

The variable resistor 15' corresponds to the resistive element of the strain gauge 15 in FIG. 1. This resistor 15' is series-connected to a resistor 21, and the series combination 15', 21 is connected across an AC voltage source 23, in parallel with a series-connected pair of resistors 25, 27. The resistor-pair 25, 27 is delimited by points a and b, and is saddled about a point c, whereas the resistor-pair 15', 21 is saddled about a point d. The resistors 21, 25 and 27 have a common resistance value R.

Points a and b are connected to respective inputs of a comparator 29, and points c and d are connected to respective inputs of an operational amplifier 31. The outputs of the comparator 29 and amplifier 31 are connected to respective inputs of a multiplier 33, whose output signal is passed to an output 37 via a low-pass filter 35.

The measured voltage $V_p$ at the output 37 is dependent on the resistance value of the resistive element 15', which in turn depends on the stress experienced by the strain gauge 15 as a result of mechanical deformation of the battery 5.

If so desired, the voltage $V_p$ at the output 37 may be passed to a comparator (not depicted), where it can be compared with a reference voltage $V_o$. Referring to FIG. 1, the condition $V_p=V_o$ can then be used to trigger a relay (via the carrier 19) so as to open (or close) the switch 13.

We claim:

1. Apparatus for charging a battery, comprising: a battery compartment for accommodating the battery in a manner such that its electrical terminals are in contact with a pair of electrodes, the electrodes being connectable to respective poles of a controllable source of electrical energy, a resistive strain gauge for monitoring mechanical deformation of the battery, wherein the strain gauge is attached to an elastic surface within the battery compartment, against which surface the battery is pressed when it is located in the battery compartment.

2. Apparatus according to claim 1, wherein one of the electrodes is a sprung metallic sheet and, the elastic surface is located on said sheet.

3. The apparatus as claimed in claim 1, wherein said elastic surface is a permanent part of the battery compartment and is situated so that the resistive strain gauge is not in direct contact with a surface of the battery whereby a battery can be inserted or removed from the battery compartment without any direct contact with the resistive strain gauge.

4. The apparatus as claimed in claim 1, wherein said elastic surface and said resistive strain gauge are permanently mounted within said battery compartment in a manner whereby the resistive strain gauge does not directly contact a surface of the battery when the battery is located within the battery compartment.

5. The apparatus as claimed in claim 1, wherein one of the electrodes comprises a thin metal elastic member mounted in a cantilever fashion within the battery compartment and the elastic surface is a part of said thin metal elastic member.

6. A battery-operated electrical apparatus, comprising: a battery compartment for accommodating a rechargeable battery in a manner such that its electrical terminals are in contact with a pair of electrodes which are connected to a controllable drain of electrical energy, and a resistive strain gauge is attached to an elastic surface within the battery compartment, against which surface the battery is pressed when it is located in the battery compartment.

7. Apparatus according to claim 3, wherein one of the electrodes is a sprung metallic sheet and the elastic surface is located on said sheet.

8. Apparatus for charging a battery comprising:
a battery compartment for accommodating the battery in a manner such that its electrical terminals are in contact with a pair of electrodes, means connecting the electrodes to respective poles of a controllable source of electrical energy, a resistive strain gauge for monitoring mechanical deformation of the battery, wherein the strain gauge is attached to a surface of an elastic member, which member is in direct contact with the battery when the battery is located in the battery compartment, whereby a change in a physical dimension of the battery during operation thereof is indirectly monitored via the resistive strain gauge.

* * * * *